(12) United States Patent
Shetty et al.

(10) Patent No.: US 11,451,588 B2
(45) Date of Patent: Sep. 20, 2022

(54) EXCHANGING AND ACTING ON SECURITY EVENTS AT AN ENTERPRISE USING PERMISSIONED BLOCKCHAIN

(71) Applicant: VMWARE, INC., Palo Alto, CA (US)

(72) Inventors: Rohit Pradeep Shetty, Bangalore (IN); Pon Venkatesh M, Bangalore (IN); Sheetal Deenadayalan, Bangalore (IN); Pushkal Maheshwari, Bangalore (IN); Erich Peter Stuntebeck, Marietta, GA (US)

(73) Assignee: VMware, Inc., Palo Alto, CA (US)

( * ) Notice: Subject to any disclaimer, the term of this patent is extended or adjusted under 35 U.S.C. 154(b) by 148 days.

(21) Appl. No.: 16/910,113

(22) Filed: Jun. 24, 2020

(65) Prior Publication Data

US 2021/0344717 A1  Nov. 4, 2021

(30) Foreign Application Priority Data

Apr. 30, 2020 (IN) .............................. 202041018538

(51) Int. Cl.
*H04L 9/40* (2022.01)
*H04L 9/06* (2006.01)
*H04L 9/32* (2006.01)
*H04L 9/00* (2022.01)

(52) U.S. Cl.
CPC .......... *H04L 63/20* (2013.01); *H04L 9/0637* (2013.01); *H04L 9/0643* (2013.01); *H04L 9/3239* (2013.01); *H04L 63/1416* (2013.01); *H04L 9/50* (2022.05)

(58) Field of Classification Search
CPC ..... H04L 63/20; H04L 9/0637; H04L 9/0643; H04L 9/3239; H04L 63/1416; H04L 2209/38
See application file for complete search history.

(56) References Cited

U.S. PATENT DOCUMENTS

| 10,129,269 B1* | 11/2018 | Ford ....................... H04L 67/22 |
| 2017/0279818 A1* | 9/2017 | Milazzo .............. H04L 63/1433 |
| 2018/0088928 A1* | 3/2018 | Smith ................... H04L 9/3239 |
| 2018/0176229 A1* | 6/2018 | Bathen ................ H04W 12/106 |
| 2018/0332063 A1* | 11/2018 | Ford ................... H04L 63/1425 |
| 2019/0109717 A1* | 4/2019 | Reddy .................. H04L 9/0643 |
| 2019/0334886 A1* | 10/2019 | Lelcuk ................ H04L 63/0876 |

(Continued)

*Primary Examiner* — Darren B Schwartz
(74) *Attorney, Agent, or Firm* — Thomas | Horstemeyer LLP

(57) ABSTRACT

Various examples are disclosed for exchanging and acting on detected security events using permissioned blockchain. A unique identifier for a client device is obtained in response to a detected security event being identified. Security event data associated with the detected security event is sent to a plurality of nodes of a blockchain service, where the nodes are associated with a respective one of a plurality of computer security services and are configured to validate the security event data and endorse the security event data in response to predetermined criteria being satisfied. In response to the security event data being validated by the nodes, the security event data is published into the blockchain service as a block that is broadcasted to the nodes, where individual ones of the nodes are configured to store the security event data of the block in a local ledger.

20 Claims, 4 Drawing Sheets

(56) References Cited

U.S. PATENT DOCUMENTS

| | | | |
|---|---|---|---|
| 2020/0014720 A1* | 1/2020 | Giura | H04L 63/1433 |
| 2020/0052903 A1* | 2/2020 | Lam | H04L 9/3218 |
| 2020/0092091 A1* | 3/2020 | Muller | H04L 63/0428 |
| 2021/0266173 A1* | 8/2021 | Ratakonda | H04L 9/3268 |

* cited by examiner

EXCHANGING AND ACTING ON SECURITY EVENTS AT AN ENTERPRISE USING PERMISSIONED BLOCKCHAIN

RELATED APPLICATIONS

Benefit is claimed under 35 U.S.C. 119(a)-(d) to Foreign application Serial No. 202041018538 filed in India entitled "EXCHANGING AND ACTING ON SECURITY EVENTS AT AN ENTERPRISE USING PERMISSIONED BLOCKCHAIN", on Apr. 30, 2020, by VMware, Inc., which is herein incorporated in its entirety by reference for all purposes.

BACKGROUND

Various enterprises and other organizations utilize a multitude of varying enterprise security products deployed on their devices and networks. For instance, security products can include, mobile device management services, anti-virus applications, email analysis services, anti-malware applications, network penetration testing services, and other security products. These security products are often offered by different vendors and, as such, utilize proprietary servers for data storage. As such, security vulnerability data is collected from an enterprise device or network and stored in respective proprietary servers, which is not shared among security vendors.

In order to exchange security data, such as a list of potential vulnerabilities of an enterprise network, point-to-point integration must be performed between two or more enterprise security product vendors. As an organization might have several enterprise security and administrative products deployed on an enterprise device or network, it is not feasible to perform point-to-point integration to share data among a multitude of security products and services. Further, data originating from security products never reconciled or stored in a common location.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
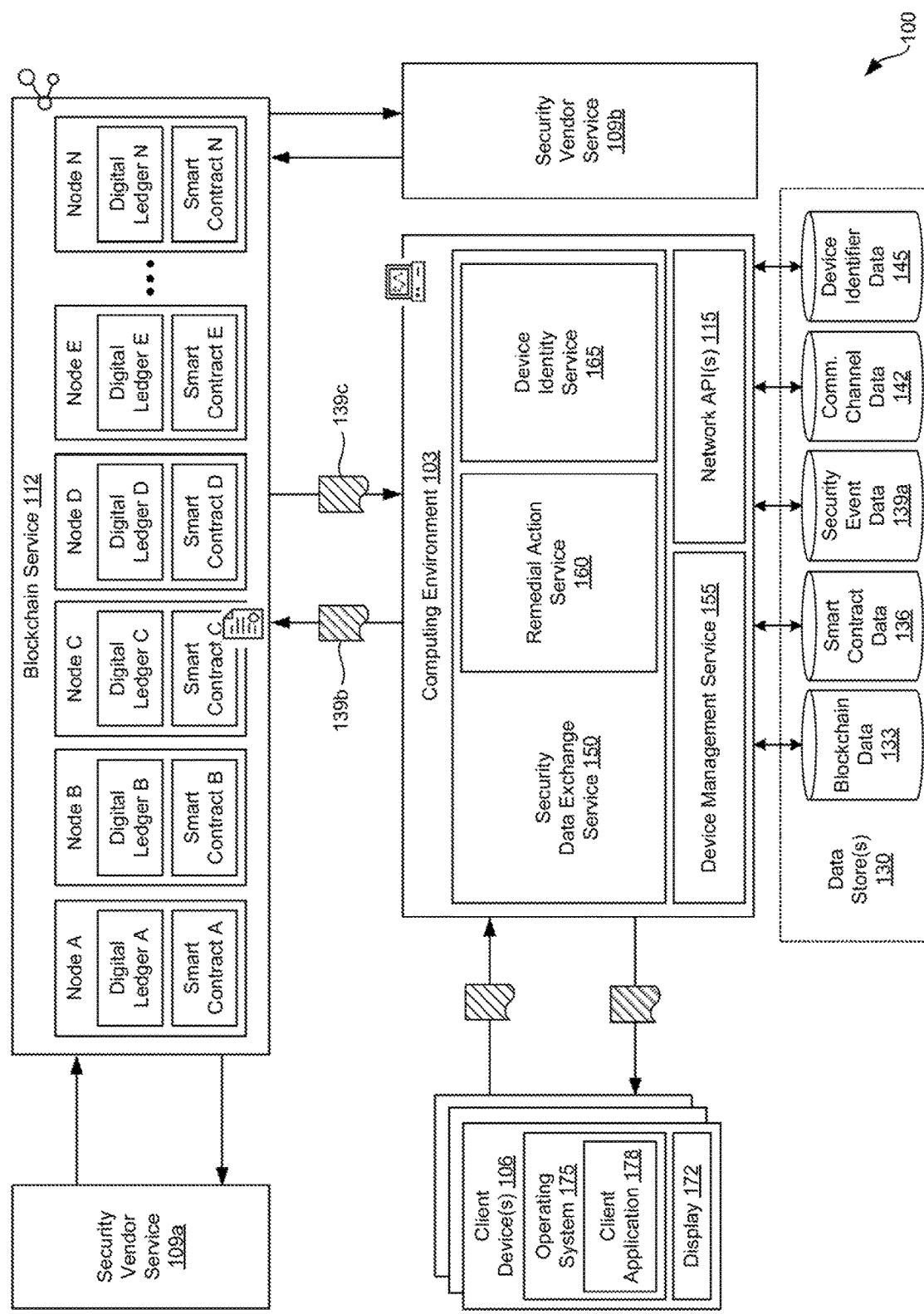
FIG. 1 is a drawing of an example of a networked computing environment for exchanging and acting on security events at an enterprise using permissioned blockchain.

The present disclosure relates to exchanging and acting on security events at an enterprise using permissioned blockchain. Various enterprises and other organizations utilize a multitude of varying enterprise security products deployed on their devices and networks. For instance, administrators for an enterprise, AlphaCo, may utilize a mobile device management service from Security Vendor A, an anti-virus application offered by Security Vendor B, anti-malware services from Security Vendor C, network penetration testing services from Security Vendor D, and so forth. As these security products are often offered by different vendors, data associated with detected security events, such as detected malware or virus, may be stored on proprietary servers of the vendors.

Today, data is not exchanged among the security vendors and, as such, duplicative actions are often performed. For instance, if a virus were detected on an enterprise device, an enterprise device management service of Security Vendor A may attempt to perform a remedial action while the anti-virus application offered by Security Vendor B attempts to perform the same or different remedial action, which can impair performance or configuration of an enterprise device. To restate, data associated with detected security events is collected from a client device or a network and is stored in respective proprietary servers, which is not shared among security vendors.

In order to exchange security data, such as a list of potential vulnerabilities of an enterprise network, point-to-point integration must be performed between two or more enterprise security product vendors. As an organization might have several enterprise security and administrative products deployed on an enterprise device or network, it is not feasible to perform point-to-point integration to share data among a multitude of security products and services. For instance, if an enterprise employs twenty security vendors, it is not feasible to send event data to twenty servers, nor is it feasible to send identifying information associated with the client device on which the security event was detected.

Accordingly, various examples for a decentralized and distributed security data exchange (SDE) system is described that utilizes a permissioned blockchain service. The permissioned blockchain service facilitates the exchange of information between participating entities, such as security vendors, using predefined criteria. As a permissioned blockchain service is employed, the storage of security data is decentralized, tamper resistant, and cryptographically secure. To this end, the security data exchange system can provide a two-way (or more than two-way) flow of security event data among various security vendors or other desired entities. Further, duplication of remedial actions is reduced or removed, thereby streamlining performance of remedial actions and preventing inconvenience to device users and administrators due to overzealous or multiple overlapping remediations.

In some examples, the blockchain service can implement secure data streams, or communication channels, for highly-trusted vendors in which high priority confidential data, or other data, may be shared separately other than a common channel. This provides flexibility as well as additional security. Separate data streams can also be used to share different types of threat data if needed.

In further examples, the security data exchange system described herein can implement an incentive-based program where points are accrued by security vendors or other entities based on detection and/or remediation of threats as well as based on votes by other security vendors. In some examples, having a number of accrued points can be used by vendors to gain access to restricted or high priority channels. Further, the security data exchange system can prevent personally identifying information (PII) being stored on the blockchain service due to usage of smart contract protocols as identity services.

In further examples, the security data exchange system can be limited to one client installation per customer. For instance, a customer can include an owner of a network and associated infrastructure. In one examples, a customer is an enterprise having an enterprise network with a plurality of enterprise devices, such as smartphones, personal computers, peripheral devices, and other devices.

Based on the examples described herein, the security data exchange system provides various advantages over the existing state of the art. For instance, the security data exchange system provides a common identity mechanism which is consistent for entities like device and user across installations, infrastructure, engagement type, vendor associations; provide a way of authenticating security vendors before engaging and keeping the authentication and participation on par with contributions and benefits; formulating, enforcing, and updating the common code of conduct for all participating security vendors; and preventing duplicate remedial actions using channels and special events.

Turning now to FIG. 1, an example of a networked environment 100 is shown. The networked environment 100 can include a computing environment 103, client devices 106, security vendor services 109a, 109b, and a blockchains service 112 in communication with one other over a network. The network can include, for example, the Internet, intranets, extranets, wide area networks (WANs), local area networks (LANs), wired networks, wireless networks, other suitable networks, or any combination of two or more such networks.

The network of the networked environment 100 can include satellite networks, cable networks, Ethernet networks, telephony networks, and other types of networks. The computing environment 103 can be formed up of devices installed in racks, thereby forming a server bank, aggregate computing system, or a computer bank in a data center or other like facility. In some examples, the computing environment 103 can include one or more high-availability computing systems, which includes a group of computing devices that acts as a single system and provides a continuous uptime. The devices in the computing environment 103 can include any number of physical machines, virtual machines, virtual appliances, and software associated therewith, such as operating systems, drivers, hypervisors, scripts, and applications.

The computing environment 103, and the various hardware and software components contained therein, can include infrastructure of the networked environment 100 that provide one or more network application programming interfaces (APIs) 115. For instance, the computing environment 103 can provide a network-based application programming interface that permits an application or service to generate, store, retrieve, delete, or otherwise interact with the client device 106, the security vendor services 109, and/or the blockchain service 112.

The computing environment 103 can include an enterprise computing environment that includes hundreds or even thousands of physical machines, virtual machines, and other software implemented in devices stored in racks, distributed geographically, and connected to one another through the network. As such, the computing environment 103 can be referred to as a distributed computing environment in some examples.

It is understood that any virtual machine or virtual appliance is implemented using at least one physical device, such as a server or other computing device. The physical computing resources of the computing environment 103 can include, for example, physical computing hardware, such as memory and storage devices, servers, switches, graphics cards having one or more GPUs installed thereon, central processing units (CPUs), power supplies, and similar devices. In various examples, the computing environment 103 can include requisite physical hardware and software to create and manage virtualization infrastructure, a cloud computing environment, an on-premise environment, and/or a serverless computing environment.

Each server can act as a host in the computing environment 103, and thereby can include one or more virtual machines (VMs). In some examples, a hypervisor can be installed on a server to support a virtual machine execution space within which one or more virtual machines can be concurrently instantiated and executed. The hypervisor can include the ESX™ hypervisor by VMware®, the ESXi™ hypervisor by VMware®, or similar hypervisor. It is understood that the computing environment 103 can be scalable, meaning that computing resources of the computing environment 103 can increase or decrease dynamically to include or remove servers, switches, GPUs, power sources, and other components without downtime or otherwise impairing performance of the services offered by the computing environment 103.

The computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. The computing environment 103 can include or be operated as one or more virtualized computer instances in some examples.

For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client devices 106 over the network, sometimes remotely, the computing environment 103 can be described as a remote computing environment 103 in some examples.

The computing environment 103 can include a data store 130 which can include one or more databases in some examples. The data store 130 can include memory of the computing environment 103, mass storage resources of the computing environment 103, or any other storage resources on which data can be stored by the computing environment 103. The data store 130 can include memory of one or more servers in some examples. Further, the data store 130 can include one or more relational databases, such as structured query language databases, non-SQL databases, or other relational or non-relational databases. The data stored in the data store 130, for example, can be associated with the operation of the various services or functional entities described below.

The data store 130 can include blockchain data 133, smart contract data 136, security event data 139, communication channel data 142, device identifier data 145, as well as other data. Blockchain data 133 can include data associated with one or more "blocks," which are data objects stored in the blockchain service 112. Smart contract data 136 can include information associated with a smart contract protocol, which can include a data object utilized by various types of blockchain services 112. For instance, the smart contract data 136 can include criteria for validating data of the blockchain service 112, code that directs a computing device to validate the data, as well as other data.

Security event data 139 can include information associated with one or more detected security events. As a detected security event can include at least one of malware detected on a client device 106, a virus detected on the client device 106, state of the client device 106 not being in conformance with at least one enterprise-related compliance rule, or other security event, the security event data 139 can include a unique identifier of the client device 106, a type of malware, virus, or non-compliant state information, as well as other related data.

Communication channel data 142 can include information associated with one or more communications channels utilized by the security vendor services 109 and the blockchain service 112. For instance, communication channel data 142 can include a list of security vendor services 109 or other nodes that subscribe to particular types of events, such as malware events, device management events, virus events, or other security-related events. Device identifier data 145 can include identifiers that uniquely identify a client device 106. The security vendor services 109 may include computer security services operated by one or more security vendors, such as Security Vendor A (e.g., AlphaCo), Security Vendor B (e.g., BetaCo), and so forth. In some examples, a unique identifier includes an alphanumeric string that can be used to query the data store 130 or blocks in the blockchain service 133 to identify security event data 139 associated with a corresponding client device 106.

The components executed on the computing environment 103 can include, for example, a security data exchange service 150, a device management service 155, as well as other applications, services, processes, systems, engines, or functionality not discussed in detail herein.

The security data exchange service 150 can oversee operation of the blockchain service 112 as well as interactions between the blockchain service 112 and the security vendor services 109. For instance, the security data exchange service 150 can generate credentials for individual ones of the security vendor services 109 to access the blockchain service 112 and/or blocks stored therein, maintain communication channels for subsets of the security vendor services 109 to share security event data 139, and perform other similar actions.

Further, the security data exchange service 150 can include a remedial action service 160 and a device identity service 165. The remedial action service 160 can perform remedial actions based on security events detected on client devices 106. For instance, if a virus or malware is identified on a client device 106, the remedial action service 160 can attempt a removal of the virus or malware by quarantining an application or service. The device identity service 165 can provide device identifiers or other device identifier data 145, for instance, in response to a request for a device identifier from a security vendor service 109.

The blockchain service 112 includes a network service that implements a blockchain protocol on a plurality of computing nodes, which may include servers of one or more security vendor services 109. Accordingly, the blockchain service 112 may include tamper resistant digital ledgers implemented in a distributed computing arrangement without a central repository. In some examples, the blockchain service 112 acts without a central authority. In alternative examples, the blockchain service 112 acts with the computing environment 103 of an enterprise as a central authority.

The blockchain service 112 enables security vendor services 109 to record transactions in a shared digital ledger such that, under normal operation of the blockchain service 112, no transactions can be changed or tampered once published. Each security vendor service 109 can maintain an up-to-date digital ledger such that the security vendor services 109 can access security event data 139 from the digital ledger. As such, the blockchain service 112 offers consistent availability of security event data 139 and other information across all security vendor services 109.

In some examples, the blockchain service 112 provides security vendor services 109 with incentives to contribute to a digital ledger containing security event data 139. To this end, in some examples, the computing environment 103 can implement an incentive-based system where access permissions of a security vendor service 109 can increase or decrease based on points or other value assigned to a security vendor service 109. Accordingly, security vendors who regularly contribute detected security events to the digital ledger can make be rewarded with an increase in score or point value.

In some examples, a metric value determined for a security vendor service 109 can be determined based on a detected security event resulting in a "will-act" event or a "has-acted" event being recorded in association with the detected security event. This indicates that a threat detected by a security vendor service 109 was correct, thus resulting in evaluation and action by another one of the security vendor services 109. In additional examples, a metric value determined for a security vendor service 109 can be determined based on the security vendor service 109 recording "will-act" events and "has-acted" events, indicating that the security vendor service 109 is an active participant in alleviating security defects in the networked environment 100. In further examples, the security vendor service 109 can be ranked among other security vendor services 109 based on events contributed by each of the security vendor services 109. This may prevent security vendor services 109 from obtaining elevated permissions through dumping irrelevant data into the digital ledger and thus spamming all other security vendor services 109. Also, a higher tally of points or a higher metric score accrued would allow security vendor services 109 to be elevated into channels which do not contain normal security events, but rather contain high-confidentiality events which are shared among a restricted set of security vendor services 109.

In a security event exchange system duplication of remedial action by various ones of the security vendor services 109 can be a cause of concern. For example, security vendor services 109 other than those operated by a common enterprise of the computing environment 103 might read a detected malware event and also try to perform remedial action. This can result in several duplicate actions being performed on a client device 106 and might inconvenience a user or put the client device 106 in an unknown state. To prevent duplication of remedial action, we propose smart contracts to perform roles.

For instance, for any detected security event, security vendor services 109 willing to perform a remedial action can reply to the detected security event with a "will-act" event containing a same event identifier as the detected security event. The "will-act" event can be sent in a separate remedial action channel other than a main channel used to broadcast security events and can also contain some details about the remediation. In some examples, the remedial action channel can include only vendors which can perform some remedial action. Based on a timestamp of the "will-act" events and also the reputation (e.g., point-based or metric-based) of the security vendor services 109, the smart contracts may approve the "will-act" event from only one vendor while rejecting others. The selected vendor will then perform the remedial action and send two events into the blockchain service 112. First, "Event 1" will include a "has-acted" event sent in the remedial action channel containing a same event identifier as the original malware detected event and the "will-act" event. Second, "Event 2" will be sent in the common channel with a new event identifier and also details of the remedial action performed.

In case the selected security vendor service 109 does not follow up with these two events within a certain predefined time window, other vendors can resend "will-act" events to perform the remedial action. An incentive system, such as a point based or a metric value, could be used where security vendor services 109 who successfully act on detected threats are given increases in points or metric value, or heightened access permissions can be provided. Similarly, if a security vendor service 109 sends a "will-act" event and does not follow with a "has-acted" event, a point value or a metric score for a security vendor service 109 can be degraded.

In other words, a metric value for individual ones of the computer security services can be determined. For instance, the metric value being determined based at least in part on a will-act or has-acted event generated by a corresponding one of the computer security services, where the will-act or has-acted event includes an event recorded in association with the detected security event by the corresponding one of the computer security services. Additionally, a level of access to data stored in the blockchain service can be assigned to the individual ones of the computer security services based on the metric value determined for the corresponding one of the computing security services. Alternatively, different ones of the security vendor services 109 can be selected to perform a remedial action based on a corresponding metric value. For instance, a security vendor service 109 having a highest metric value, indicating that the security vendor service 109 is the most trusted, can be selected to perform a remedial action.

In further examples, up until a selection of the security vendor service 109 to perform a remedial action based on receipt of a "will-act" events, read data permissions of a selected one of the security vendor services 109 are suspended for a predefined timeframe or until a "has-acted" event is received, whichever earlier. This can be performed so that security vendor services 109 respond with "will-act" events only when they are perfectly capable and intend to act on the malware detected event or other detected security event.

Figure 2:
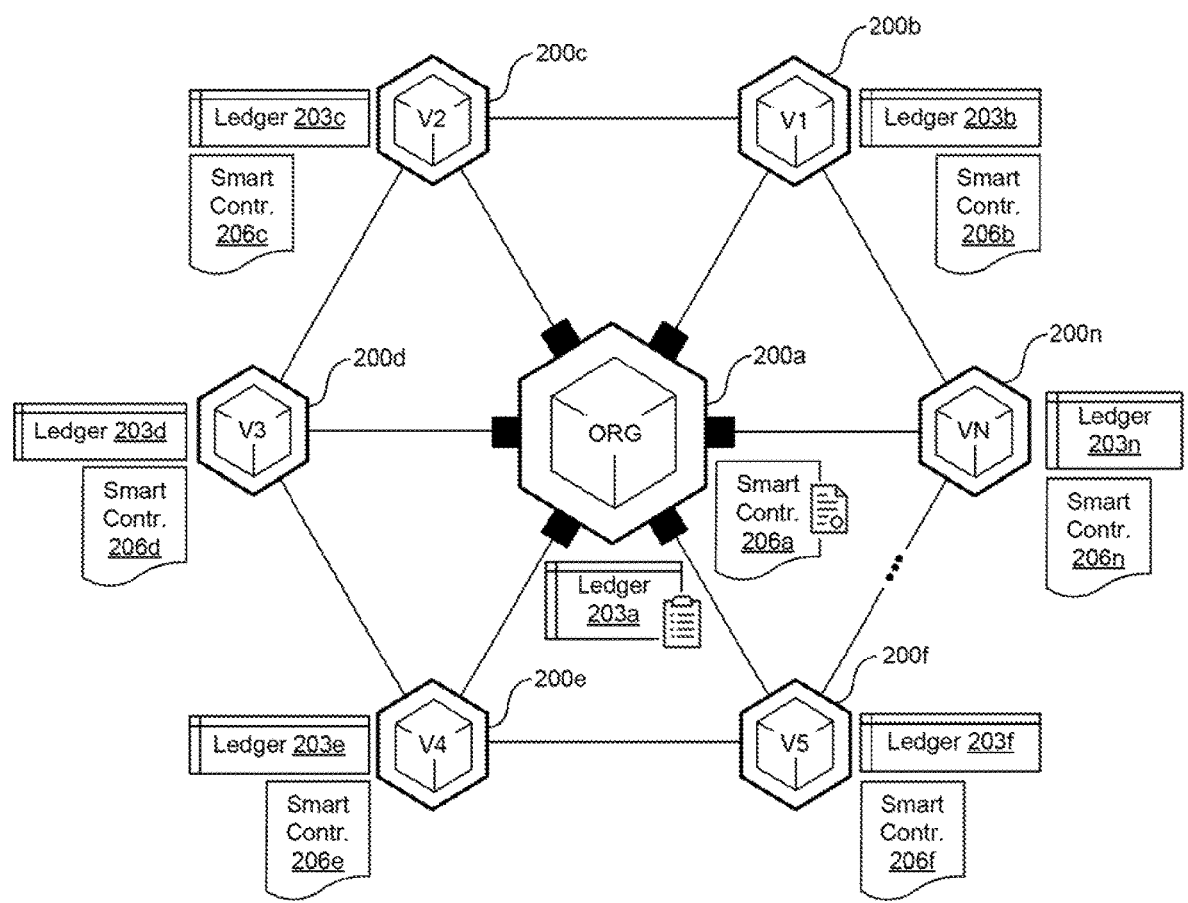
FIG. 2 is a schematic diagram illustrating a three-tier internet-of-things computer architecture.

Referring now to FIG. 2, a schematic diagram of the blockchain service 112 is shown according to various examples. In some examples, the blockchain service 112 includes a permission-based blockchain deployed by an organization ("ORG"), which can include an enterprise in some examples. As can be appreciated, the blockchain service 112 is a blockchain protocol implemented by a plurality of computing nodes 200a . . . 200n. The computing nodes 200 can include a server or collection of servers maintained by ORG or respective security vendors V1 . . . VN. For instance, a first one of the nodes 200a can include the computing environment 103 and other ones of the nodes 200b . . . 200n can include servers of a security vendor V1 to VN.

The security vendors V1 to VN can include security vendors utilized by an enterprise. For example, V1 can include a security vendor of an anti-virus service, V2 can include a security vendor of an anti-malware service, V3 can include an email firewall service, and so forth. As shown in FIG. 2, membership of the blockchain service 112 and other administrative privileges can controlled by the central node 200a, operated by ORG, with each of the security vendors V1 . . . VN reading and writing information into digital ledgers 203a . . . 203n stored in memory of each of the nodes 200. Further, each of the nodes 200 can include smart contracts 206a . . . 206n (or "smart contract protocols") that are present at every node 200.

Smart contracts 206 can include programs or data objects having executable code that is executed to direct a respective node 200 to perform security event data validation, access rights enforcement, and other tasks described herein. Generally, execution of a smart contract 206 implements a prescribed interface. As such, operational logic of the blockchain service 112 can reside in the smart contract 206. In various examples, the smart contract 206 initializes and manages a state of the digital ledger 203 through transactions submitted by the security vendor services 109.

Further, in some examples, the smart contract 206 can be employed to validate if transactions submitted by one or more of the security vendor services 109 is compliant with a predetermined data format. To this end, only data which fulfills predefined conditions is permitted to be stored in the blockchain service 112. Further, the smart contract 206 can generate a unique device identifier or a unique user identifier using set of pre-decided parameters passed by one or more of the security vendor services 109.

In further examples, the smart contract 206 can validate if security event data 139 sent to the blockchain service 112 contains any personally identifiable information. If so, security event data 139 can be rejected for storage by the blockchain service 112. In another example, the smart contract 206 can restrict access rights to various types of security information based on a vendor profile corresponding to one of the security vendor services 109. In yet another example, the smart contract 206 can be require a security vendor service 109 to contribute an equal amount of unique data into the digital ledger 203 of the blockchain service 112 as compared to an amount of data consumed.

Figure 3:
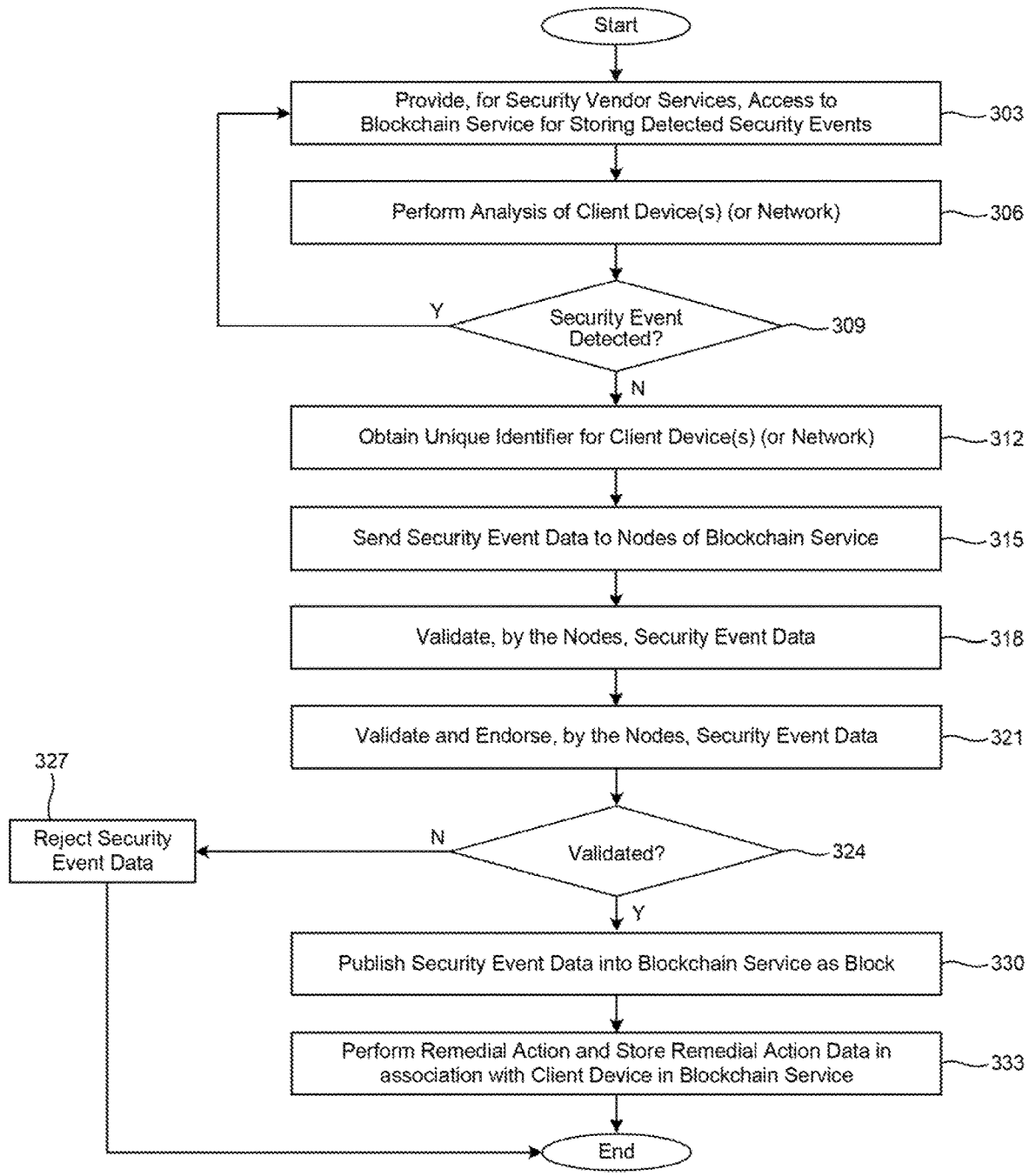
FIGS. 3-4 are flowcharts illustrating functionality implemented by components of the networked computing environment of FIG. 1 in exchanging and acting on security events using permissioned blockchain.

Moving on to FIG. 3, a flowchart is shown that provides one example of the operation of a portion of the networked environment 100. The flowchart of FIG. 3 can be viewed as depicting an example of elements of a method implemented by the computing environment 103 or other node 200 of the blockchain service 112 according to one or more examples. The separation or segmentation of functionality as discussed herein is presented for illustrative purposes only.

Beginning with step 303, the computing environment 103 or a security vendor service 109 can provide, for a multitude of security vendor services 109, access to a blockchain service 112 for storing and sharing detected security events. For instance, the computing environment 103 can generate authentication credentials for the security vendor services 109 and/or subscribe individual ones of the security vendor services 109 to one or more communications channels. A communication channel can include a collection of nodes 200 that all have a same copy of a digital ledger 203. The digital ledger 203 updates according to the transactions that are submitted by the security vendor services 109.

In step 306, the computing environment 103 or a security vendor service 109 can perform an analysis of a client device 106. For instance, the computing environment 103 or a security vendor service 109 can perform a virus scan on a client device 106, an anti-malware scan on a client device 106, access a device profile generated for a client device 106 to determine whether the state of the client device 106 is in compliance with one or more enterprise-related compliance rules, as well as other analyses. While various examples described herein relate to analysis of a client device 106, in some examples, the computing environment 103 can perform an analysis of a network, a server, or a collection of client devices 106.

In step 309, the computing environment 103 or a security vendor service 109 can determine whether a security event was detected. A detected security event can include, for example, malware detected on the client device 106, a virus detected on the client device 106, a state of the client device 106 not being in conformance with at least one enterprise-related compliance rule, or other security event as can be appreciated. If a security event is not detected, the process can revert to step 303 to continue providing the blockchain service 112. Alternatively, if a security event is detected, the process can proceed to step 312.

Next, in step 312, the computing environment 103 or a security vendor service 109 can obtain a unique identifier for the client device 106, for example, in response to the detected security event being identified on the client device 106. In some examples, the computing environment 103 or the security vendor service 109 can obtain the unique identifier using the device identity service 165. As can be appreciated, every entity including a client device 106, a user of the client device 106, networking component, server, or other components in an organization can be provided a unique identification number.

In some examples, the unique identification number can be obtained by each of the security vendor services 109 by passing specific predefined parameters to the device identity service 165. Alternatively, a smart contract 206 can access a subset of parameters from a security event input, such as a username, email address, employee id, or other data and determine a unique device identifier or a unique user identifier using a one-way hash. A mapping of unique identifiers to internal identifiers used by security vendor services 109 can be retained by each of the security vendor services 109 in their internal databases. Accordingly, security vendors can use unique device identifiers to write events and retrieve data from local ledgers when needed. Using unique device identifier or unique user identifiers for each of the detected security events stored in the blockchain service 112 assists in having no personally identifiable information stored in the blockchain service 112. Thus, even in unlikely circumstances of data being leaked from the blockchain service 112, personally identifiable information will not be disseminated.

In step 315, the computing environment 103 or a security vendor service 109 can send the security event data 139 associated with the detected security event to the blockchain service 112. As can be appreciated, sending the security event data 139 to the blockchain service 112 causes the security event data 139 to be sent to the nodes 200 of the blockchain service 112.

In step 318, the computing environment 103 or a security vendor service 109 can validate the security event data 139 and, if validated, endorse the security event data 139. In some examples, validating the security event data 139 and endorsing the security event data 139 can include identifying predetermined criteria from a smart contract 206, determining that the security event data 139 satisfies the predetermined criteria on respective ones of the nodes 200, and validating, by the individual ones of the nodes 200, the security event data 139 using code specified in the smart contract 206. The code in the smart contract 206 can include a routine that cryptographically verifies a unique identifier generated for a client device 106 or a user of the client device 106 in some examples.

Accordingly, in step 321, the computing environment 103 or a security vendor service 109 can determine whether the security event data 139 has been validated, for instance, by a node 200 or a number of nodes 200 exceeding a predefined threshold. If the security event data 139 is not validated, the process can proceed to step 327 to reject the security event data 139. In other words, the security event data 139 is not stored in the blockchain service 112. Thereafter, the process can proceed to completion.

Referring back to 324, if the security event data 139 is validated, the process can proceed to step 330. In step 330, the computing environment 103 or a security vendor service 109 can publish the security event data 139 into the blockchain service 112 as a block. In some examples, the blockchain service 112 causes the block to be broadcasted to all of the nodes 200 such that the nodes 200 store or update the block in a local digital ledger 203.

Finally, in step 333, the computing environment 103 or a security vendor service 109 can perform a remedial action in response to the security event data 139 being published on the blockchain service 112. For instance, if a virus or malware is identified on a client device 106, the remedial action service 160 can attempt a removal of the virus or malware by quarantining an application or service. In some examples, data associated with the remedial action is stored on the blockchain service 112, for instance, in association with the client device 106 or the detected security event. Thereafter, the process can proceed to completion.

Figure 4:
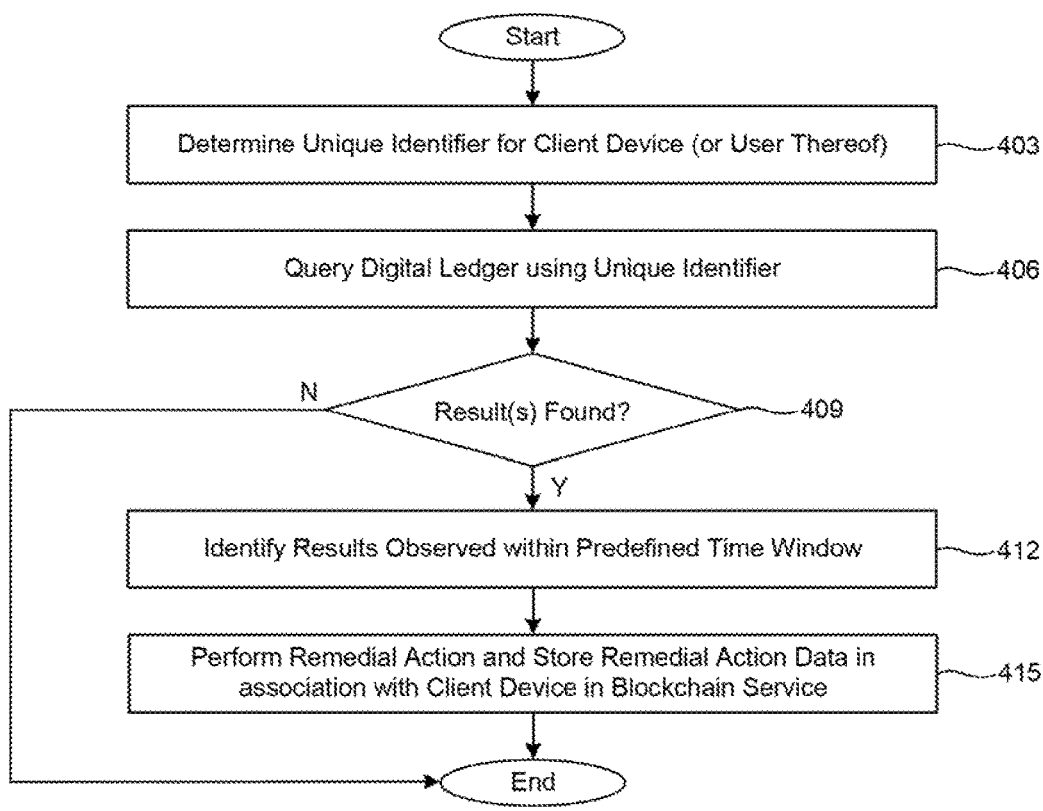

Referring now to FIG. 4, a flowchart is shown that provides one example of the operation of a portion of the networked environment 100. The flowchart of FIG. 4 can be viewed as depicting an example of elements of a method implemented by the computing environment 103 or other node 200 of the blockchain service 112 according to one or more examples. The separation or segmentation of functionality as discussed herein is presented for illustrative purposes only.

Some blockchain services 112 utilize a key-value database to store a state of a blockchain. For instance, a security vendor service 109 can query to obtain a value of a single key or multiple keys. If a digital ledger 203 is in a data storage format, such as XML or JSON, complex searches can be performed against. In case of a read operation, a security vendor service 109 can query the digital ledger 203 using a single unique identifier or multiple unique identifier through a smart contract 206 to obtain requested data. In this case, no endorsements or validations are generally needed.

In some situations, however, an enterprise may wish to obtain all recent security data of a particular client device 106. For instance, an administrator for the enterprise may wish to obtain recent security data of a particular client device 106 after observing unusual behavior on the client device 106.

Accordingly, to do so, in step 403, the computing environment 103 or a security vendor service 109 can determine a unique identifier for a client device 106 or a user thereof. In some examples, the computing environment 103 or the security vendor service 109 can obtain the unique identifier using the device identity service 165. For instance, if an administrator wishes to review recent security event data 139 for a client device 106, the administrator can provide the smart contract 206 with information associated with the client device 106, such as email address, username, or other information. A unique identifier may be provided based on such information.

Next, in step 406, the computing environment 103 or the security vendor service 109 can query the digital ledger 206 using the unique identifier determined in step 403.

In step 409, the computing environment 103 or the security vendor service 109 can determine whether one or more results were found. If no results are found, the process can proceed to completion. Alternatively, if one or more results were located, the process can proceed to step 412.

In step 412, the computing environment 103 or a security vendor service 109 can identify results observed within a predefined time window. For instance, referring to the example above, if an administrator of an enterprise wishes to obtain recent security data of a particular client device 106 after observing unusual behavior on the client device 106, the computing environment 103 or a security vendor service 109 may identify results obtained within a past day, past week, or other suitable amount of time. It is understood that the results received will include malware or other detected security event written into the digital ledger 203 by a contributing one of the security vendor services 109.

Finally, in step 415, the computing environment 103 or a security vendor service 109 can now perform a remedial action on the client device 106, for instance, based on the results obtained in step 412. For instance, if a virus or malware is identified on a client device 106, the remedial action service 160 can attempt a removal of the virus or malware by quarantining an application or service. In some examples, data associated with the remedial action is stored on the blockchain service 112, for instance, in association with the client device 106 or the detected security event. Thereafter, the process can proceed to completion. Thereafter, the process can proceed to completion.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be electric or of some other available construction.

Client devices 106 can be used to access user interfaces generated to configure or otherwise interact with the computing environment 103. These client devices 106 can include a display upon which a user interface generated by a client application for providing a virtual desktop session (or other session) can be rendered. In some examples, the user interface can be generated using user interface data provided by the computing environment 103. The client device 106 can also include one or more input/output devices that can include, for example, a capacitive touch-screen or other type of touch input device, fingerprint reader, or keyboard.

Although the various services and applications described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A method for exchanging and acting on detected security events using permissioned blockchain, comprising:
    obtaining a unique identifier for a client device in response to a detected security event being identified on the client device, the unique identifier being obtained from a device identity service;
    sending security event data associated with the detected security event to a plurality of nodes of a blockchain service, the nodes being associated with a respective one of a plurality of computer security services and being configured to validate and endorse the security event data in response to predetermined criteria being satisfied;
    in response to the security event data being validated and endorsed by the nodes, publishing the security event data into the blockchain service as a block that is broadcasted to the nodes;
    storing, by individual ones of the nodes, the security event data of the block in a local ledger;
    performing, by at least one of the nodes, a remedial action in response to the security event data being published on the blockchain service, wherein data associated with the remedial action is stored on the blockchain service in association with the client device; and
    assigning a level of access to data stored in the blockchain service to the individual ones of the computer security services based on a metric value determined for the corresponding one of the computing security services.

2. The method of claim 1, wherein the detected security event comprises at least one of: malware detected on the client device; a virus detected on the client device; and a state of the client device not being in conformance with at least one enterprise-related compliance rule.

3. The method of claim 1, wherein sending the security event data associated with the detected security event to the nodes of the blockchain service comprises identifying the nodes of the blockchain service from a plurality of potential nodes of the blockchain service based at least in part on the nodes of the blockchain service subscribing to a common one of a plurality of blockchain communication channels.

4. The method of claim 1, wherein validating the security event data and endorsing the security event data in response to the predetermined criteria being satisfied comprises:
    identifying the predetermined criteria from a smart contract protocol;
    determining that the security event data satisfies the predetermined criteria on respective ones of the nodes; and
    validating, by the individual ones of the nodes, the security event data using code specified in the smart contract protocol.

5. The method of claim 4, wherein determining that the security event data satisfies the predetermined criteria on the respective ones of the nodes further comprises determining that a threshold portion of the nodes of the blockchain service has validated and endorsed the security event data.

6. The method of claim 4, wherein determining that the security event data satisfies the predetermined criteria on the respective ones of the nodes comprises:
    identifying that the security event data is in compliance with a predefined data format;
    determining that the security event data does not comprise personally identifying information (PII), and identifying that the unique identifier for the client device complies with a predefined identifier format.

7. The method of claim 1, further comprising:
    determining the metric value for individual ones of the computer security services, the metric value being determined based at least in part on a will-act or has-acted event generated by a corresponding one of the computer security services, the will-act or has-acted event being recorded in association with the detected security event by the corresponding one of the computer security services.

8. A system for exchanging and acting on detected security events using permissioned blockchain, comprising:
    at least one server computing device; and
    program instructions stored in memory and executable in the at least one server computing device that, when executed by the at least one server computing device, direct the at least one server computing device to:
        obtain a unique identifier for a client device in response to a detected security event being identified on the client device, the unique identifier being obtained from a device identity service;
        send security event data associated with the detected security event to a plurality of nodes of a blockchain service, the nodes being associated with a respective one of a plurality of computer security services and being configured to validate the security event data and endorse the security event data in response to predetermined criteria being satisfied;
        in response to the security event data being validated by the nodes, publish the security event data into the blockchain service as a block that is broadcasted to the nodes, wherein individual ones of the nodes are configured to store the security event data of the block in a local ledger; and
        assign a level of access to data stored in the blockchain service to the individual ones of the computer security services based on a metric value determined for the corresponding one of the computing security services.

9. The system of claim 8, wherein the detected security event comprises at least one of: malware detected on the client device; a virus detected on the client device; and a state of the client device not being in conformance with at least one enterprise-related compliance rule.

10. The system of claim 8, wherein sending the security event data associated with the detected security event to the nodes of the blockchain service comprises identifying the nodes of the blockchain service from a plurality of potential nodes of the blockchain service based at least in part on the nodes of the blockchain service subscribing to a common one of a plurality of blockchain communication channels.

11. The system of claim 8, wherein the nodes of the blockchain service are configured to validate the security event data and endorse the security event data in response to predetermined criteria being satisfied by:
   identifying the predetermined criteria from a smart contract protocol;
   determining that the security event data satisfies the predetermined criteria on respective ones of the nodes; and
   wherein the nodes of the blockchain service are configured to validate the security event data using code specified in the smart contract protocol.

12. The system of claim 11, wherein determining that the security event data satisfies the predetermined criteria on the respective ones of the nodes further comprises determining that a threshold portion of the nodes of the blockchain service has validated and endorsed the security event data.

13. The system of claim 11, wherein determining that the security event data satisfies the predetermined criteria on the respective ones of the nodes comprises: identifying that the security event data is in compliance with a predefined data format; determining that the security event data does not comprise personally identifying information (PII), and identifying that the unique identifier for the client device complies with a predefined identifier format.

14. The system of claim 8, wherein the at least one computing device is further directed to:
   determine a metric value for individual ones of the computer security services, the metric value being determined based at least in part on a will-act or has-acted event generated by a corresponding one of the computer security services, the will-act or has-acted event being recorded in association with the detected security event by the corresponding one of the computer security services; and
   assign a level of access to data stored in the blockchain service to the individual ones of the computer security services based on the metric value determined for the corresponding one of the computing security services.

15. A non-transitory computer-readable medium for exchanging and acting on detected security events using permissioned blockchain comprising program instructions that, when executed by at least one computing device, direct the at least one computing device to:
   obtain a unique identifier for a client device in response to a detected security event being identified on the client device, the unique identifier being obtained from a device identity service;
   send security event data associated with the detected security event to a plurality of nodes of a blockchain service, the nodes being associated with a respective one of a plurality of computer security services and being configured to validate the security event data and endorse the security event data in response to predetermined criteria being satisfied;
   in response to the security event data being validated by the nodes, publish the security event data into the blockchain service as a block that is broadcasted to the nodes, wherein individual ones of the nodes are configured to store the security event data of the block in a local ledger; and
   assign a level of access to data stored in the blockchain service to the individual ones of the computer security services based on a metric value determined for the corresponding one of the computing security services.

16. The non-transitory computer-readable medium of claim 15, wherein the detected security event comprises at least one of: malware detected on the client device; a virus detected on the client device; and a state of the client device not being in conformance with at least one enterprise-related compliance rule.

17. The non-transitory computer-readable medium of claim 15, wherein sending the security event data associated with the detected security event to the nodes of the blockchain service comprises identifying the nodes of the blockchain service from a plurality of potential nodes of the blockchain service based at least in part on the nodes of the blockchain service subscribing to a common one of a plurality of blockchain communication channels.

18. The non-transitory computer-readable medium of claim 15, wherein the nodes of the blockchain service are configured to validate the security event data and endorse the security event data in response to predetermined criteria being satisfied by:
   identifying the predetermined criteria from a smart contract protocol;
   determining that the security event data satisfies the predetermined criteria on respective ones of the nodes of the blockchain service; and
   wherein the nodes of the blockchain service are configured to validate the security event data using code specified in the smart contract protocol.

19. The non-transitory computer-readable medium of claim 18, wherein determining that the security event data satisfies the predetermined criteria on the respective ones of the nodes comprises:
   identifying that the security event data is in compliance with a predefined data format;
   determining that the security event data does not comprise personally identifying information (PII), identifying that the unique identifier for the client device complies with a predefined identifier format; and determining that a threshold portion of the nodes of the blockchain service has validated and endorsed the security event data.

20. The non-transitory computer-readable medium of claim 15, wherein the at least one computing device is further directed to:
   determine the metric value for individual ones of the computer security services, the metric value being determined based at least in part on a will-act or has-acted event generated by a corresponding one of the computer security services, the will-act or has-acted event being recorded in association with the detected security event by the corresponding one of the computer security services.

* * * * *